Aug. 25, 1931.   W. A. PERRY   1,820,823
EARTHWORKING APPARATUS
Filed Dec. 10, 1928   2 Sheets-Sheet 2
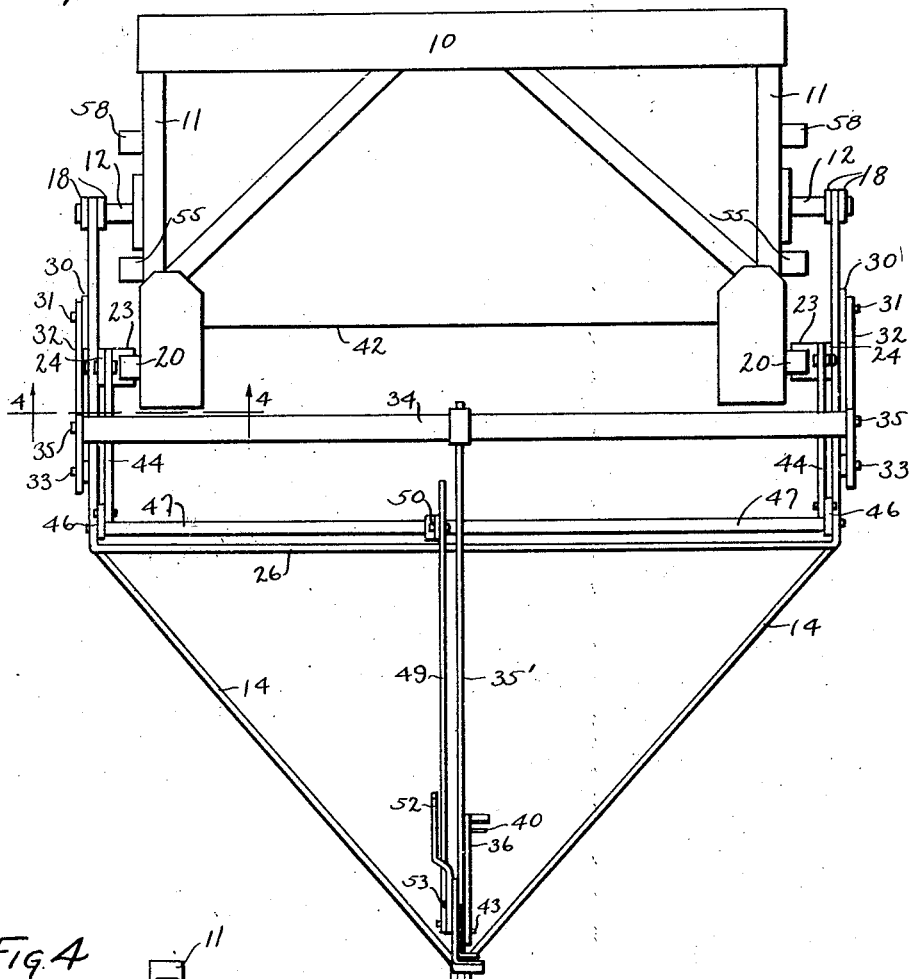
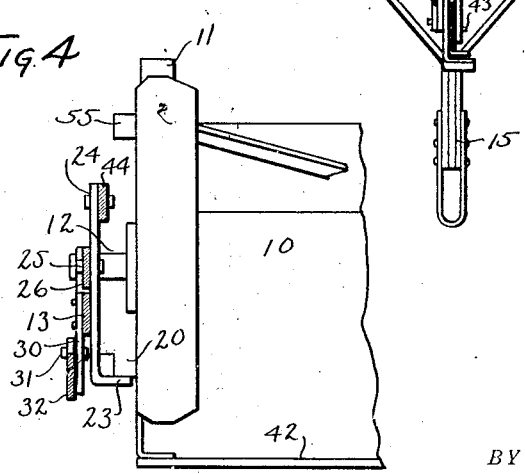
INVENTOR
William A Perry
BY Marechal & Noe
ATTORNEYS Patented Aug. 25, 1931

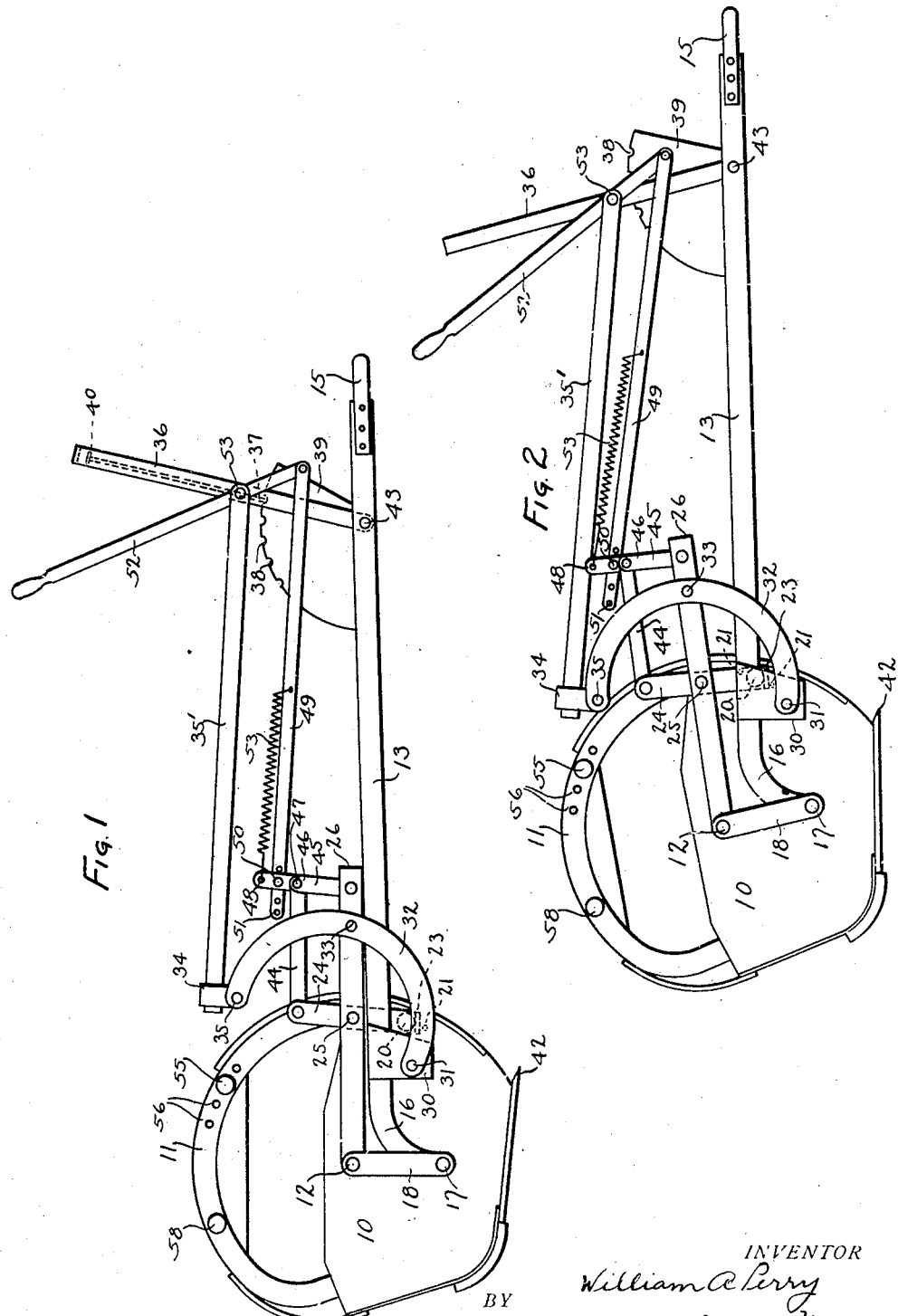

1,820,823

UNITED STATES PATENT OFFICE

WILLIAM A. PERRY, OF SIDNEY, OHIO

EARTHWORKING APPARATUS

Application filed December 10, 1928. Serial No. 324,920.

This invention relates to earth-handling apparatus and particularly to scrapers of the roll-over type.

One object of the invention is the provision of a scraper of the roll-over type having mechanism for controlling the depth of cut so arranged that it may be easily operated without undue force and designed so that the front of the scoop tends to be raised to decrease the depth of cut when the scoop is loaded.

Another object of the invention is the provision of a scraper of this character having articulated frame portions, one of which is movable substantially in the direction of pull and connected in such a way to a scoop stop that the force exerted by the pull on the frame tending to decrease the depth of cut is such as to require a small manual controlling force to increase the depth of cut of the scoop.

Other objects and advantages of the invention will be apparent from the following description and from the drawings, in which—

Fig. 1 is a side elevation of a scraper embodying the present invention, showing the parts in effective scraping position;

Fig. 2 is a side elevation of the scraper showing the parts positioned for a shallow cut;

Fig. 3 is a top plan view of the scraper; and

Fig. 4 is a vertical section on the line 4—4 of the Fig. 3.

In the accompanying drawings wherein a preferred embodiment of the invention is shown for purposes of illustration, 10 designates a scraper bowl or scoop of well-known construction, having curved or circular runner shoes 11. Trunnions 12 are provided on opposite ends of the scoop, these trunnions being journaled or mounted for rotation in a draft frame or yoke designated generally by the reference character 13.

The draft frame, as shown, comprises a pulling yoke 13 having a front tongue portion 15 which is adapted to be coupled to and pulled by a tractor, truck, or any other desired pulling means. The spaced rear ends of this yoke are curved downwardly at 16, where they are pivotally connected at 17 to two links 18 provided one on each side of the scraper scoop. These links 18 extend downwardly from the trunnions 12 to which they are pivotally connected. It will thus be apparent that the yoke 13 is movable relatively to the scoop in a substantially horizontal direction corresponding to the line of pull. The scoop 10 is provided with a stop or stops which hold it in its proper cutting position, these stops being shown in the form of stop pins 20, one of which projects from each side of the scoop. Preferably each stop pin 20 is removably mounted in a series of holes 21 in the runner shoe 11. When the scoop cuts into the earth there is of course a rearward drag on the bottom of the scoop tending to rotate the scoop in a clockwise direction as shown in Fig. 1, and therefore the stop pins 20 are held in the desired position for effective cutting operation by stop members 23 projecting inwardly towards the ends of the scoop into the path of the stop pins. These stop members 23 take the form of inwardly bent ends of stop levers 24, one of which is preferably provided on each side of the scoop. The stop levers 24 are pivoted by means of short shafts or bolts 25 to an adjustable yoke 26. The yoke 26 is substantially U-shaped, the two legs of the yoke extending rearwardly, one on each side, to their pivot connections at their rear ends to trunnion 12. This yoke 26 overlies the rear end of the pulling yoke 13, and is shown resting upon the pulling yoke when the scoop is in position for maximum depth of cut, see Fig. 1.

Near the rear end of each side of the pulling yoke 13 is fastened a plate 30 to which is pivotally connected a link 32 at 31, this link shown as substantially semicircular in form. At points considerably forward of the link connection 31, the links 32 are pivoted at 33 to the yoke 26, the links extending upwardly from the points 33 to cross member 34 to which they are pivotally connected at 35. The cross member 34 connects the upper ends of the two links 32 and adjacent its central portion is connected by a rod 35' to a hand lever 36 which is pivoted at 43 to the pulling yoke near the front of the latter, where it is convenient for manual operation by one riding on the tractor or other device serving as a pulling medium for the scraper. The lever 36 may be locked in several different positions relatively to the frame by means of a latch 37 which is engageable with notches 38 in a segment 39 provided on the pulling yoke. Release of the latch 37 against the tension of a spring (not shown) may be effected by a release handle 40 which may be pulled upwardly by the operator when the effective position of the scoop is to be changed. When the latch 37 is engaged with the notches of the segment 39, the position of the links 32 is definitely determined, the notch in which the latch is shown engaged in Fig. 1 being for maximum depth of cut of the scoop.

When the hand lever 36 is moved rearwardly to the position shown in Fig. 2 the upper ends of the links 32 move rearwardly, the yoke 26 swings upwardly about the trunnions 12, and the pulling yoke 13 moves forwardly a little distance in the direction of the tractive pull. When the latch 37 is engaged with one of the notches in the locking segment 39, the relative positions of the links 32 and the yokes 26 and 13 are definitely determined. When the yoke 26 is raised from the pulling yoke 13 it of course carries with it the stop levers 24 and raises the position of the stop members 23 so as to cause the cutting edge 42 of the scraper to move upwardly. With the scoop positioned as shown in Fig. 2, the cutting edge 42 of the scoop is adapted to take a shallow cut in the ground. When the hand lever 36 is moved rearwardly as far as it will go, then the yoke 26 is raised still higher about the trunnions of the scoop, and the stop members 23, being raised higher, causes the cutting surface in the bottom of the scoop to be inclined upwardly and forwardly so that the cutting edge 42 is clear of the ground and the load in the scoop may be transported or carried to the desired spot without cutting further into the ground.

The link connection between the pulling yoke 13 and the yoke 26 on which the stop members are provided is such that, when the scoop is loaded and a comparatively large pulling force is exerted on the pulling frame or yoke, the raising tendency exerted on the yoke 26 by that portion of the pull which is effective through the links 32, will create a substantial upward force on the stop pins 20 such that a small manual force on the lever 36 is required to increase the depth of cut. When the scoop is fully loaded and is being pulled over the ground the comparatively large tractive force has considerable tendency to cause the tractive yoke 13 to move forward relatively to the scoop, and in moving forwardly it must of course raise the stop members 23 to decrease the depth of cut. When the scoop is positioned for maximum depth of cut, as shown in Fig. 1, and the drag due to the cutting edge 42 of the scoop digging into the earth is added to the drag of the full scoop along the ground, the leverage effective by the links 32 is sufficient to cause a rearward pull on the hand lever 36 so that the operator must overcome this rearward pull when moving the hand lever 36 forwardly to increase the depth of cut. When he wishes to decrease the depth of cut or pull the cutting edge entirely out of the ground for transporting the loaded scoop the ground drag or tractive force therefore supplies the power required. Even when the scoop is adjusted for a small depth of cut as shown in Fig. 2, and the scoop is only partly loaded, the force exerted by the tractive effect through the links 32 causes a rearward force on the hand lever 36, although under such conditions this rearward force is much less than that obtained when the scoop is full since the weight of the scoop with its contents is comparatively small under such conditions and less tractive force is required. When the scoop is empty and adjusted for minimum depth of cut, the hand lever 36 being in one of its rear positions, the arrangement is such that the parts are almost in a state of balance when latch 37 is disconnected from the notches in the locking segment. Under these conditions the effective leverage of the links 32 is considerable since there is a more direct line of force from yoke 13 to yoke 26; but the drag on the scoop is minimum so the smaller force and increased leverage may counteract for balanced conditions. Under normal cutting operations therefore the scoop always tends to move in a counterclockwise direction by reason of the tractive pull on the scraper frame. When the operator desires to increase the depth of cut, and pulls forwardly on the lever 36, he must overcome the tendency of the yoke 26 and the stop members 23 to rise under the force exerted by the tractive pull on the frame; but it is usually when the scoop is empty and the tractive force a minimum that this is to be accomplished, and under such conditions practically no force is required from the operator.

As the scoop fills with earth while taking a cut, the force exerted by the links 32 on the yoke 26 constantly increases so that by the time the scoop is fully loaded, the operator merely releases the latch 37 from its holding position and the tractive force itself causes the scoop to be rotated counter-clockwise out of cutting engagement with the earth and the earth can then be dragged to wherever it is to be dumped.

The scraper is provided with a device for withdrawing the stop member 23 from in front of the pin 20 when the load is to be dumped. For this purpose the upper end of the two stop levers 24 are pivotally connected to forwardly extending links 44 pivoted in turn to a cross frame 45. This cross frame embodies upwardly extending arms 46 pivotally mounted on the yoke 26 and fixed to a transverse bar 47 to which is fixed an upstanding arm 48 preferably at the center of this bar. The levers or arms 24 and 46 are so connected that when the arm 48 is moved a rocking movement of the stop arms 24 is effected. The upstanding arm 48 is pivotally connected to an operating rod 49 by means of a bolt 50 which may be fixed in any desired hole of a series of openings 51 provided in the end of the operating rod. The forward end of this operating rod is pivotally connected to a lever 52 which is pivotally connected at 53 preferably to the hand lever 36 so that the upper ends of both of these levers are positioned conveniently adjacent one another where they are readily accessible to the operator. A spring 53 is preferably provided having one end connected to the arm 48 and the other to the operating rod 49 so that the stop members 23 are normally urged rearwardly to a position below the stop pins 20. The tension of this spring is overcome manually so as to rock the stop arms 24 counter-clockwise and remove the stop members 23 from beneath the pins 20 when the hand lever 52 is pulled forwardly. When so moved, the scoop rolls along the ground on the shoes 11, and if the load is to be spread and not dumped in a heap the control lever 52 is released as soon as the stop pins 20 have moved past the stop members 23 so that the stop members are returned to stopping position where they may engage and stop the spreading pins 55. One of these spreading pins 55 is preferably provided on each side of the scraper, and like the stop pins 20, are preferably adapted to be easily removed from the runner shoes so that their positions may be adjusted, a series of holes 56 being provided in each runner shoe in any one of which the spreading pin may be held. These spreading pins stop the rotation of the scraper after it has moved a part of a revolution, and the scraping edge 42 is then in a suitable position above the ground at the rear of the scraper so that the dirt in the scraper may be spread, the thickness of the spread being controlled of course by the position of the spreading pins 55.

To dump the load in a heap, dump pins 58 are provided, and when the load is to be dumped in this way the hand lever 52 is not released until the spreading pins 55 have passed by the stop members 23 which are of course held over out of their path. When the stop members 55 move by, the hand lever 52 is released so that the stop members 23 are in position to stop or be engaged by the dump pins 58, the result being that the scraper rotates as it is pulled forward over the ground and the load is dumped in a heap. The construction of the scraper furthermore permits the load to be dumped when the scraper is being backed. The stop pins provided in the runner shoes 11 are arranged to prevent clockwise rotation of the scraper, but should the scraper be moved rearwardly over the ground, as where a load is to be dumped close to a wall or other obstruction, it will be evident that the scoop can rotate in a counter-clockwise direction during its rearward movement to dump the load when the scoop completes about half a revolution.

It will now be evident that the scraper construction is such that but little physical exertion is required from the operator, as the tractive pull created by the truck or other pulling device is the force which is used in reducing the depth of cut of the scoop. The various operating devices are positioned where they may be conveniently accessible, and the construction furthermore is such that reliance upon objectionable and unreliable springs is unnecessary.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In a scraper of the class described, a scoop having side trunnions, a pulling frame comprising a frame portion, links connecting said frame portion to said trunnions, a second frame portion connected to said trunnions, a link interconnecting said frame portions, a stop on said scoop, a stop member supported on said second frame portion, said frame transmitting a portion of the pull on the frame to said stop member in a manner tending to raise the front of the scoop, a lever for controlling the position of said second frame portion relatively to said first frame portion to vary the depth of cut, latch means for said lever, the force exerted on said stop member by the pull on the frame being such as to require the exertion of a controlling force on said means to increase the depth of cut when the scoop is full.

2. In a scraper, a scoop, a pulling frame connected to said scoop, a stop on said scoop, a stop member supported on said frame, said frame having a part movable relatively to said scoop substantially in the line of pull and transmitting a portion of the pull on the frame to said stop member in a manner tending to raise the front of the scoop, links connecting said part to said scoop, the frame having a portion adjustably connected to said part and pivotally connected to the scoop, and means for controlling the relative position of said first-named part, said links, and said frame portion to vary the depth of cut, the force exerted on said stop member by the pull on the frame being such as to re- 3. In a scraper, a scoop, a pulling frame connected to said scoop, said pulling frame comprising a yoke, links connecting said yoke and said scoop so that the yoke can move substantially horizontally relatively to said scoop, a stop on said scoop, and a frame portion connected to said scoop, a stop member pivotally mounted on said frame portion on an axis movable relatively to said yoke, link means adjustably connecting said yoke and said frame portion so that a portion of the pull exerted on the frame is transmitted to said stop member in a manner tending to raise the front of the scoop, and means for holding said link connection in desired position to govern depth of cut.

4. In a scraper, a scoop, a pulling frame connected to said scoop, said pulling frame comprising a yoke and links connecting said yoke and said scoop so that the yoke can move sbstantially horizontally relatively to said scoop, a stop on said scoop, a stop member pivotally mounted on said frame about an axis movable relatively to said yoke, a system of links connecting said stop member and said frame so that the force exerted on said stop member by the pull on the frame tending to raise the front of the scoop increases as the front of the scoop is raised, and means for locking said link system in a plurality of different positions.

5. In a scraper, a scoop, a pulling frame connected to said scoop, said pulling frame comprising a yoke and links connecting said yoke and said scoop so that the yoke can move substantially horizontally relatively to said scoop, a stop on said scoop, a stop member pivotally mounted on said frame about an axis movable relatively to said yoke, and a system of links connecting said stop member and said frame so that the force exerted on said stop member by the pull on the frame tending to raise the front of the scoop increases as the front of the scoop is raised, means for manually controlling the position of said link system, latch means for said controlling means for holding said controlling means in a number of different positions of adjustment corresponding to various depths of cut, the force exerted on said stop member by the pull on the frame being such as to require the exertion of a manual force on said means to increase the depth of cut.

6. In a scraper, a scoop, a pulling frame in which said scoop is rotatably mounted, a stop on said scoop, said pulling frame comprising a yoke movable substantially horizontally in the direction of pull, a pair of links connecting the rear ends of said yoke to said scoop, an adjustable part connected to said scoop, a stop member pivotally mounted on said adjustable part for normally stopping rotation of the scoop, a link connection between said adjustable part and said yoke whereby a pull on said frame tends to move said adjustable part and said stop member upwardly, means for adjusting said adjustable part to various positions in accordance with the desired depth of cut, latch means for said controlling means for holding said controlling means in a number of different positions of adjustment corresponding to various depths of cut, the force exerted on said stop member by said link connection being such as to require an overcoming force by said means to increase the depth of cut so that the scoop may be maintained in stable transporting position, and means positively controlling said stop member to move it out of co-action with the scoop so that the scoop may be rotated in said frame.

In testimony whereof I hereto affix my signature.

WILLIAM A. PERRY.